INVENTOR
L. F. GOELLER, JR.
BY [signature]
ATTORNEY

United States Patent Office 3,378,650

Patented Apr. 16, 1968

3,378,650
COMMUNICATION SYSTEM SIGNALING AND TESTING EQUIPMENT

Leopold F. Goeller, Jr., Holmdel Township, Monmouth County, N.J., assignor to Bell Telephone Laboratories, Incorporated, New York, N.Y., a corporation of New York Filed Oct. 15, 1964, Ser. No. 403,989
26 Claims. (Cl. 179—175.2)

ABSTRACT OF THE DISCLOSURE

A program controlled telephone system is disclosed having equipment which provides for the testing of a called telephone line for excessive leakage and foreign potential prior to the ringing of the called phone. The equipment also includes magnetic latching relays for establishing the test configurations and ferrods for sensing the results of the tests as well as the supply of ringing to the called phone and the tripping of that ringing.

This invention relates to signaling and testing equipment and particularly to equipment employed in communication systems for controlling the operation of electro-responsive devices, such as ringers, of telephones. My invention further relates to a ringing control circuit which is selectively switched into a plurality of configurations in response to instructions from a program controlled data processor to perform tests for a foreign potential and an excessive leakage resistance on a called telephone line prior to the application of ringing power to the line and furthermore to trip, or interrupt, that power after the rung telephone has been answered.

It has been a common practice in certain existing telephone systems to supply ringing current to a called telephone line via a trunk circuit and a ringing selection switch associated with a ringing power source. In such an arrangement, the trunk circuit generally controls the entire ringing operation, but it is unable to test for an undesirable leakage resistance and a foreign potential on a called line.

Each such trunk circuit is customarily equipped with apparatus for activating one of a group of ringing selection switches to select an appropriate type of ringing power for actuating the ringer of the called phone. It is also usually furnished with a relay, or similar device, which detects when the rung telephone has been answered and which then trips, or interrupts, the supply of ringing power to the called line.

Occasionally, the proper operation of the foregoing ringing control apparatus is impaired due to either a non-detected undesirable leakage resistance on the called line or an undetected cross between that line and a foreign power source. The impaired operation usually results in the premature operation of the trip ringing relay and, consequently, the inadequate actuation of the ringer of the called phone.

Although such undesired leakage and power cross conditions occur somewhat infrequently in present day telephone systems, they do lower the quality of service. In addition, the currently available ringing control arrangements have no facilities for detecting such conditions and preventing the resultant improper ringing of called telephones as well as the false assessment of call charges against the calling parties. Moreover, these arrangements have proven to some extent costly and complex because, for example, a large amount of apparatus is needed on an individual basis in each of the trunk circuits for controlling the ringing selection switches and the tripping of ringing.

Such an arrangement is further complicated by a need for a rigid assignment of the trunk circuits to ringing selection switches. Furthermore, the power distribution in such an arrangement is often by means of an expensive, intricate wiring and bus network from the power equipment to the ringing selection switches and the trunk circuits. In many instances, this rigid trunk circuit assignment and power distribution configuration has impeded the rapid, simple and economical changeover of installed trunk circuits to different types of ringing power.

In view of the foregoing, it is apparent that a need exists for simple, reliable and economical facilities for controlling the actuation of an electro-responsive device, such as the ringer, of a called telephone. More specifically, such facilities should include apparatus for sensing electrical conditions on a called telephone line which impair the proper actuation of the electro-responsive device.

Accordingly, it is an object of my invention to reduce the cost and complexity of the equipment utilized in communication systems for controlling the actuation of the electro-responsive devices of telephones, while at the same time enabling it to furnish efficient and high quality signaling to customers.

Another object is to insure the proper signaling of a called telephone by providing apparatus for detecting electrical conditions on a called line which impair the proper actuation of the telephone ringer.

It is another object of this invention to provide simple ringing power distribution facilities for use in a telephone office.

These and other objects of my invention are attained in a specific exemplary embodiment thereof in an electronic telephone system comprising simple and economical ringing control circuitry which insures the proper ringing of a called telephone by testing for excessive leakage resistance and foreign potential on the called line immediately before ringing current can be supplied to actuate the associated ringer. This circuitry eliminates the need for the special ringing selection switches of the prior art and for the individual trip ringing relay heretofore required in each trunk circuit.

In the specific embodiment, the ringing control facilities are entirely divorced from the trunk circuits of the telephone system. These facilities are incorporated in a ringing control circuit which has a short-holding time on each call and which is used on a common control basis for controlling the ringing of called telephones without any connection to the trunk circuits serving the calls. Thus, only a few ringing control circuits are needed in a telephone system, whereas heretofore individual ringing facilities had to be included in each of several thousands of trunk circuits in the system.

The ringing circuit is equipped with an appearance in the telephone switching network and this appearance is selectively connected through the nework to a called telephone line for the testing and ringing operations in response to programmed instructions from a high-speed data processor. After such connections have been established, the processor instructs a signal distributor to switch the ringing control circuit successively into a plurality of distinct states for testing initially for foreign potential on the called line and then for excessively low leakage resistance thereon before the ringing power may be supplied to the line. When no such potential or leakage is sensed by the ringing circuit, the processor detects these favorable conditions and causes the circuit to connect the power to its aforementioned appearance for ringing the called phone. However, if a foreign potential or an excessive leakage on the called line is sensed by the ringing circuit, ringing power is not connected to the line and the calling line is connected to an operator position for receiving information concerning the trouble. In addition, a maintenance record is automatically made concerning the called line and the sensed trouble. This mode of operation insures that a called telephone is not improperly signaled and that adverse signal transmission conditions on a customer line are detected.

The ringing control circuit is equipped with three pairs of scan leads, or points, each pair of which is associated with an individual ferrod sensor device in a scanner and is also selectively connected to a two-conductor (tip and ring) appearance in the switching network under the control of four magnetically latching relays. The ferrods are current sensitive devices which are utilized primarily for monitoring the current flow through the two conductors when they are connected to a called line. These devices sense foreign potentials and excessive leakage resistances on the called line which impair the proper actuation of the associated telephone ringers. The devices also sense the flow of ringing current to the called line and the tripping of that current after the rung phone has been answered. The scanner periodically scans these ferrods under the instructions received from the processor to readout the sensed conditions. Ferrods are further disclosed in J. A. Baldwin, Jr.-H. F. May patent application Ser. No. 26,758, filed May 4, 1960, now U.S. Patent 3,175,042 of Mar. 23, 1965.

Each of the aforementioned magnetically latching relays has its operate winding connected over an individual lead to a signal distributor which acts as a buffer between the high speed electronic data processor and the relatively slow speed latching relays. The disributor receives instructions from the processor one at a time and then applies an electrical pulse to a selected one of the leads for operating the associated one of the latching relays to establish the connections between the network appearance and the appropriate ferrod. In operating, a latching relay opens or closes its contacts to establish the desired connections and also magnetically latches, or locks, operated until a release pulse is subsequently received over the associated lead from the distributor. Such a release pulse is applied to the lead in response to an instruction from the processor. The advantages of using such relays are that they operate and release in response to pulses and require no "hold" current to remain operated during the testing and ringing operations. In the exemplary embodiment, the four relays are operated or released one-at-a-time and provide nine distinct switching states out of an available sixteen for the leakage and power cross testing of private lines, two (tip and ring) party lines, and private branch exchange lines, as well as for the ringing of the associated telephones.

The latching relays also control a pair of auxiliary relays in the ringing circuit to connect a ringing power source to the aforementioned network appearance via a series path including a lightning protection inductance and the winding of a relay which is operated for detecting when the called telephone has been answered. In operating, the latter relay also controls the auxiliary relays to interrupt the connections between the ringing power source and the network appearance.

Certain of the structural features of the exemplary ringing control circuit may be understood by explaining at this time the order in which the network appearance is connected to the ferrods and to the ringing power source in response to instructions from the processor. After a local call to a private or two-party line or a PBX line has been initiated and the called number information has been received, the processor locates an idle ringing control circuit for the called phone and an idle tone circuit which returns a tone to the calling party while the called phone is being rung. Next, the processor instructs the switching network to connect the tone circuit to the calling line and the called line to the ringing circuit. Shortly afterwards, the processor instructs the distributor to switch the ringing circuit from its IDLE state into its so-called POWER CROSS state by activating one of the latching relays.

In the POWER CROSS state, a ferrod sensor is connected via a pair of the scan points and contacts of the activated latching relay to the tip and ring conductors of the network appearance extending to the tip and ring leads of the called line for testing for foreign potentials thereon. The latter ferrod is activated in response to a current produced by an excessive foreign potential on the line but remains inactive in the absence of such a potential. This ferrod is scanned by the scanner to detect the presence or absence of an excessive foreign potential on the called line.

The POWER CROSS state is used to test for foreign potentials on private and two-party lines. A so-called PBX POWER CROSS state is also employed in the ringing circuit to test for foreign potentials on a PBX line. This latter state is essentially the same as the POWER CROSS state. The only difference is that an additional resistor is included between the ferrod and the tip conductor of the network appearance to desensitize the ferrod to a power cross test of the tip lead because that lead normally has a potential connected thereto via a resistance or ring-up relay winding at the PBX when a call is not in progress thereon.

Following the test for foreign potential, the processor selectively switches the ringing circuit into a TEST RING, TEST TIP or TEST PBX state for testing the leakage resistance between the tip and ring conductors of the called private coin or noncoin lines, two-party or PBX line, and between ground and the tip or ring conductor of such a line. The processor establishes the appropriate state by causing the operation of another latching relay. In each of these states, reference potentials are connected through another ferrod over a pair of scan leads, resistors and selected contact configurations of the latching relays to the network appearance toward the tip and ring leads of the called line. If the leakage resistance on such a line is below a prescribed value, a sufficient current is conducted over the latter path for activating the ferrod and thereby enabling the processor to detect the leakage condition during the scanning operation.

This leakage testing arrangement may be used on noncoin as well as coin lines having a so-called ground start mode of operation. It is particularly useful on the latter lines for detecting when the handset of a called telephone is "off-hook" and no coin is in the coin slot. Under such conditions, a resistance is bridged across the coin line by virtue of the "off-hook." Such a resistance is incapable of initiating a call but is capable of prematurely tripping ringing on an incoming call and initiating other equipment operations whereby a false charge may be assessed to the calling party. This bridged resistance is detected by the leakage test facilities of my invention to insure proper ringing of the called phone and prevent the aforementioned false charging.

After the processor ascertains that the leakage resistance is not excessively low, it causes the activation of the ringing circuit so that power is connected from a source for ringing the telephone of the called private line, tip or ring party of a two-party line or PBX line. To do so, the processor selectively switches the ringing circuit from its last state to its RING TIP or RING RING state by causing the release of an operated latching relay. Upon releasing, the relay activates one of the auxiliary relays which, in turn, connects a ringing power source through the winding of an answer detecting relay, a ferrod and contacts of the operated relays to the tip or ring lead of the network appearance for supplying ringing current to the tip and/or ring conductors of the called line with which the ringer is associated. For a private line, the ringer is connected between the tip and ring leads of the line. The ringer is connected from the tip lead to ground for a tip party and from the ring lead to ground for the ring party of a two-party line. A PBX line usually uses a ring-up bridge circuit between the tip and ring leads.

The last-mentioned ferrod is employed for sensing when ringing current is conducted over the ringing path to the called line and as well the continuity of the circuit to that line. This enables the processor to detect that the ringing circuit is not defective and that it need not be released and an alternate ringing circuit connected to the called line.

The impedance of the ringing trip relay and a transformer are included in the ringing path for reducing voltage surges induced by lightning during the ringing period.

The ringing power source interrupts the supply of ringing current at recurrent intervals to effect the periodic actuation of a ringer. Each time that it is so interrupted, a surge protection network is connected across the ringing path to reduce radiated noise signals produced by the inductive load.

When the rung phone is answered, the aforementioned detecting relay is operated for releasing the auxiliary relays. In releasing, the latter relays trip further ringing of the called phone and reconnect a ferrod to the network for sensing the tripped ringing. The processor thereafter detects the sensed condition during the scanning operation and switches the ringing circuit to its IDLE state. Subsequently, the processor seizes an idle trunk circuit for interconnecting the calling and called telephones.

A feature of my invention is the provision of a signaling control circuit having a communication path terminated in a switching network and apparatus activated in response to programmed instructions from common control equipment for sequentially establishing a plurality of distinct configurations to test the electrical condition of a called line prior to the application of ringing power to the line and furthermore to trip that power after the rung telephone has been answered.

Another feature is the provision of a ringing control circuit having apparatus responsive to the receipt of an instruction signal for sensing a foreign potential on a telephone line, devices responsive to another instruction signal for sensing an excessive leakage resistance on the line, and circuitry activated by other instruction signals in the absence of a sensed foreign potential and an excessive leakage for supplying ringing power to the line for ringing a telephone ringer associated therewith.

Another feature is the provision of a sensing circuit comprising a source of potential and ground, a pair of ferrods associated with the source and selectively connectable to a telephone line for sensing the electrical condition thereof, and switching apparatus responsive to the receipt of instruction signals for successively connecting each of the ferrods individually to the line for sensing any foreign potential or excessive leakage thereon.

Another feature is the provision of a ringing control circuit for a common control telephone system comprising a plurality of magnetically latching relays activated by electrical pulse signals received over control leads from common control equipment in the system, a communication path connectable over a communication line to a telephone having a ringer, equipment for supplying power to activate the ringer, apparatus responsive to the sequential activations of the relays for establishing a plurality of distinct test connections to the path and for establishing distinct signaling connections between the path and the power equipment to activate the ringer, and facilities also responsive to the relay activations for establishing supervisory connections to the testing and signaling connections.

Another feature is the provision of a ringing control circuit for a communication system comprising a ringing path connectable to a communication line having a ringer, a source of ringing power for actuating the ringer, and a ferrod associated in circuit with the ringing path and source for sensing when the ringing power is being supplied to said path.

The foregoing objects, features and advantages, as well as others, of this invention, may become more apparent from the reading of the following description with reference to the drawing in which.

Figures 2, 2A:
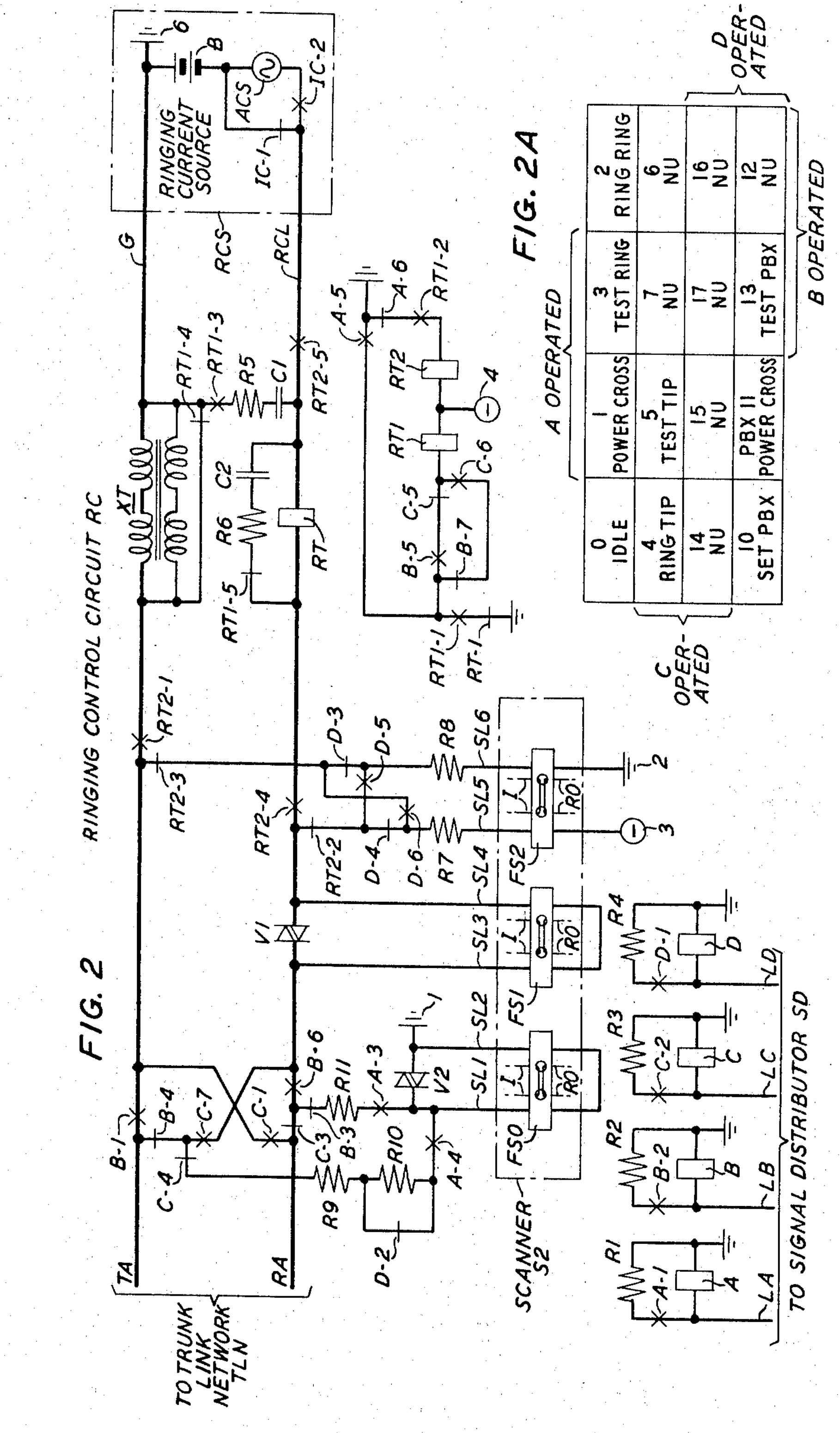
FIG. 2 shows schematically an illustrative ringing control circuit.
FIG. 2A shows a "state" diagram for the various switching states into which the ringing control circuit of FIG. 2 may be switched during the servicing of telephone calls to single party, two-party, and PBX stations.

It is noted that FIG. 2 employs a type of schematic notation for relays. This notation is referred to as "detached-contact" in which an X crossing the line represents a normally open contact of a relay and a bar crossing a line represents a normally closed contact of a relay; "normally" referring to the nonoperated, or released, state of a relay. The other relay components including its winding are represented by a rectangular symbol. The principles of this type of notation are described in an article entitled, "An Improved Detached-Contact-Type of Schematic Circuit Drawing," by F. T. Meyer in the September 1955 publication of the American Institute of Electrical Engineers Transactions, Communications and Electronics, No. 20, vol. 74, pp. 505–513.

Each relay contact is designated in the drawing in a manner which indicates the relay of which it is a part and, as well, uniquely identifies it with respect to the other contacts of the same relay. For example, referring to contact A–1 shown in the lower left side of FIG. 2, it is noted that the A portion of the designation indicates that it is controlled by the A relay of FIG. 2 and the "—1" uniquely identifies it with respect to another contact A–3 of relay A, the latter contact being shown at the left side of FIG. 2.

The equipment illustrative of the principles of the present invention has been designed for incorporation, by way of example, into an electronic program controlled telephone system of the type disclosed in the copending A. H. Doblmaier-R. W. Downing-M. P. Fabisch-J. A. Harr-H. F. May-J. S. Nowak-F. F. Taylor-W. Ulrich patent application, Ser. No. 334,875, filed Dec. 31, 1963. It is particularly concerned with the ringing circuit RC depicted by the heavy-lined block in FIG. 1. The other equipment elements are neither shown nor described in detail herein, except where necessary for a complete understanding of the invention. The cited Doblmaier et al. disclosure and the patent applications referred to therein may be consulted for a complete understanding of the construction and operation of the scanners S1 and S2, signal distributor SD and the other elements not described in detail herein. While certain of the circuit details of the line and trunk link networks LLN and TLN are set forth in the Doblmaier et al. disclosure, more definite specifications of these networks are presented in the following copending patent applications: T. N. Lowry, Ser. No. 205,920, filed June 28, 1962, now U.S. Patent 3,231,-679 of Jan. 25, 1966; A. Feiner, Ser. No. 253,083, filed Jan. 22, 1963, now U.S. Patent 3,257,513 of Oct. 25, 1966; and K. S. Dunlap-A. Feiner-R. W. Ketchledge-H. F. May, Ser. No. 295,458, filed July 16, 1963, now Patent 3,281,539 of Oct. 25, 1966.

GENERAL DESCRIPTION

The organization of the principal equipment units of the illustrative embodiment of my invention will now be described with reference to FIG. 1. The electronic switching office is designed to serve many types of telephone calls including intra-office calls. Such a call is initiated from a customer station, such as the station TS, and it is completed via the electronic switching office to a customer station, such as the station TP, RP or SP or a station of a private branch exchange PBX. An intra-office call is deemed to be a suitable type for explaining and obtaining a full understanding of the features of the present invention.

The stations TS, SP, TP and RP as well as the PBX are connected to the switching office over the telephone lines L1–LN and LP and are terminated in both a line scanner S1 and the line link network LLN. The scanner S1 is employed for sensing "on-hook" and "off-hook" signals representing calling requests for service on the lines L1–LN and LP.

The network LLN comprises switching facilities for establishing communication connections from the lines L1–LN and LP to the trunk link network TLN via network wire junctors J. Similarly, the network TLN includes switching facilities for establishing connections from the junctors J to digit receivers and dial tone supplies such as receiver DR and supply DTS, as well as to intra-office trunk circuits such as circuit TC. In addition, the network TLN is advantageously used for establishing connections from the junctors J to the audible ringing circuit AR and the ringing control circuit RC. The latter connections are used for supplying audible ringing tone to a calling line and ringing power to the called line, respectively. An advantage obtained from this use of the network TLN is that it establishes the talking paths, as well as the ringing paths required for signaling the calling and called customers.

Intra-office trunk circuit TC has a pair of appearances A1 and A2 terminated in the network TLN. The appearances A1 and A2 are selectively connectable during the establishment of a call to the calling and called lines respectively via the networks TLN and LLN.

Unlike prior art ringing circuits, the individual ringing circuits AR and RC each have an appearance in the system switching network which is used for supplying audible ringing tone and ringing power to the calling and called lines, respectively. In addition, these ring circuits are not associated with trunk circuits via special ringing selection switches as in prior art arrangements. Furthermore, the ringing circuit RC is equipped with ring tripping apparatus which eliminates the need for indivdual trip ringing relays in each of the individual trunk circuits in the system. Thus, the ringing circuit RC is essentially a common control facility which controls the ringing of called customer stations and which advantageously eliminates the costly and complex ringing control facilities in individual trunk circuits.

The ringing circuits AR and RC, as well as the trunk circuit TC have no individual line supervisory relays for monitoring "on-hook" and "off-hook" conditions on the lines L1–LN and LP during the servicing of calls. Similarly, the digit receivers do not comprise any digit registers as have been heretofore employed in prior art circuits. Instead, the ringing circuits, trunk circuits and digit receivers are provided with a plurality of scan points, such as the points SP1–SP4 to which are applied the appropriate "on-hook," "off-hook" and digit signals. These scan points are connected to the scanner S2, which senses the applied signals for subsequent use by the central processor CP.

In accordance with the Doblmaier et al. disclosure, a vast amount of the logic, control, storage, supervision and translation functions required for the operation of the ringing circuits, trunk circuits and digit receivers, as well as the other circuits of the electronic switching office are performed by the common control equipment comprising the central processor CP. Accordingly, a minimal amount of control circuitry is needed in the individual ringing circuits, trunk circuits and receivers and only the essential switching devices and transmission apparatus are included therein. These switching devices, in most instances, comprise magnetic latching relays (for example, the relays A, B, C and D of FIG. 2) which are connected to signal distributor SD. This distributor acts as a buffer between the high-speed central processor CP and the relatively slow-speed relays to provide for the operation of the relays whereby the circuits are switched into the different functional states required for serving intra-office calls. Distributor SD causes the operation and the subsequent release of the latching relays upon the receipt of programmed instructions from the processor CP.

Communications between the distributor SD, scanners S1 and S2, and processor CP are by way of bus systems and multiconductor cables which provide discrete communication paths between selected ones of the circuits. These bus systems and cables are described in Doblmaier et al. and are represented herein by the bus systems and cables BSC.

As set forth in Doblmaier et al. the processor CP is a centralized data processing facility which is employed to implement the various telephone administrative and maintenance functions of the switching system. It is divided functionally into three units comprising a call store CS, program store PS and a central control CC. The call store CS is a temporary or erasable memory facility which employs apparatus for storing information pertaining to calls in progress. Such information includes: (1) the busy-idle status of communication paths through the line and trunk link networks LLN and TLN, (2) the digits received from a digit receiver DR, and (3) the information required for connecting the appropriate ringing circuit to the calling and called lines for ringing.

The program store PS is a semipermanent memory facility which is employed to store the less changing system information including the system programs and a variety of translation information, such as the directory number to line equipment location data. Translation facilities are also furnished in the program store PS for deriving semipermanent information for routing, charging, ringing and the like on telephone calls.

The central control CC is the primary information processing unit of the system. It is capable of executing one at a time many different types of basic instructions, or orders, required for controlling the line and trunk link networks, trunk circuits, digit receivers and ringing circuits during calls. These instructions are written in the form of programs which are stored in the program store PS. The programming instructions are the vocabulary of the machine and are used to inform the switching circuits of the system how and when to perform their various functions. The central control CC requests an instruction from the program store every few milliseconds and, upon receiving it, executes or commands, the appropriate circuit or circuits to carry out the appropriate functions. Accordingly, the central control CC is the hub of the system which originates all addresses and commands to other circuits and receives back all answers from those circuits. It is important to note, however, that the central control CC is capable only of executing individual instrutcions and that the mechanized intelligence required to supply the instructions needed for the complex telephone functions of the system resides entirely in the store programs.

Turning now to the manner in which an intro-office call is served by the switching system, it is initially assumed that a customer at station TS initiates a call to one of the stations SP, RP or TP. When the caller removes the telephone handset from its cradle, an "off-hook" signal is sensed by the scanner S1 as set forth in the Doblmaier et al. disclosure. Subsequently, the central control CC, in executing a line scanning operation, interrogates the scanner S1 and reads-out the "off-hook" condition. It then consults the busy-idle information stored in the call store CS for each line to insure the "off-hook" condition has not been previously observed for line L1.

Upon ascertaining that the line L1 was previously "on-hook," the central control CC concludes that a call origination has occurred and it updates the busy-idle information for line L1 in the store CS. The central control CC knows the scanner address of line L1 and uses it to refer to a translation area in the program store PS which provides it with all of the service information it needs concerning the line L1. Such information includes data pertaining to whether the line is an individual or a party line or whether the associated telephone transmits dial pulses or TOUCH-TONE signals.

The central control CC then selects an idle digit receiver DR and the associated dial tone supply DTS for use on the call. Next, the control CC ascertains the availability of an idle path from the line L1 through the networks LLN and TLN and a junctor J to the receiver DR by consulting the busy-idle information stored in the call store CS for all paths through the link networks. Upon finding such a path, the control CC sends orders to the networks LN and TLN via the controller circuits to establish the appropriate switching connections. Thereafter, the scanner S1 is disconnected from the line L1 when the network LLN opens the cutoff contacts CA and thereby avoids any transmission degradations over the line L1 due to the scanner circuitry. The central control CC then requests the distributor SD to operate apparatus in the receiver DR for causing a dial tone to be sent to the calling line L1.

After the call connections to receiver DR have been established, the control CC scans the calling line every few milliseconds via the scanner S2 in a manner as set forth in Doblmaier et al. This scanning operation is performed to check for both the early abandonment of the call and for dial or TOUCH-TONE pulses. An abandoned call is signified by a prolonged "on-hook" condition on a line L1. Such a condition is sensed by the scanner S2 and readout by the processor CP as described in Doblmaier et al. Each time the control CC scans the calling line, it compares the present scanner reading with the immediately preceding one which is recorded in the call store. Whenever a disagreement is found by the comparison and the calling telephone is found to be "on-hook" on the next scanning operation, the control CC recognizes that a digit is being transmitted and adds one to the pulse count kept in the call store CS for the call. A digit is deemed completed when the calling line or trunk is "off-hook" and no momentary "on-hook" change has been detected for a predetermined interdigital period.

When the control CC receives the first digit pulse transmitted by the station TS, it causes the dial tone transmission to that station to be interrupted as set forth in Doblmaier et al.

After the called office code portion of the called number has been received, the control CC effects a translation of that code to obtain call routing and signaling information which is needed to complete the call to the station SP, RP, TP or PBX. In addition, the control CC obtains information from the office code translation which indicates that a predetermined number of called stations digits will be received. The routing information directs the control CC to allocate an idle intra-office trunk circuit TC for use on the call. It also informs the control CC that the call is to be completed to a local customer station. Thereafter, the control CC reserves an available communication channel through the switching network TLN and LLN between the calling line and the intraoffice trunk circuit appearance A1 on network TLN. On the receipt of the last digit of the called station number, the control CC converts the dialed number of the called customer line to a program store address and then consults the program store PS to ascertain the line equipment number and the terminating class features of the called line. The control CC thereafter converts the received line equipment number to the location of the line busy-idle bit in the call store CS in a manner as set forth in Doblmaier et al. This bit tells the control CC when the called line is idle and enables the call store CS subsequently to mark the line LN-1, LN or LP busy. In addition, the control CC signals the call store to record the information it needs during the ringing phases of a call.

As set forth in the Doblmaier et al. disclosure, the processor CP next selects the path between the line L1 and an idle audible ringing circuit AR and between the line LN-1, LN or LP and an idle ringing circuit RC. The processor CP also selects, reserves and records in the call store CS a path from the calling to the called line via the line and trunk link networks, appearances A1 and A2, and intro-office trunk circuit TC. The digit receiver DR is then released and its network path and the equipment involved in registering the called number is marked idle in the memory facilities of the processor CP. Afterwards, the control CC records in the call store the network path reserved for the talking connection. It also records the network location of the ringing and audible ringing circuits RC and AR. Before the control CC orders the establishment of the connections over the reserved paths, it also requests the ringing circuit RC to test for a foreign potential and leakage resistance on the called line to which it is connected. The processor CP subsequently sends orders via the bus BSC to the distributor SD for activating switching devices in the ringing circuits AR and RC which connect the appropriate ringing signals to the calling and called lines. The application of ringing current to the called customer line is sensed by the scanner S2 during the ringing of the called telephone, and accordingly, it cooperates with the processor CP to indicate that the call is progressing satisfactorily.

When the called customer answers, the ringing circuit RC automatically trips ringing and cooperates with the scanner S2 to notify the processor CP of the answer condition. Shortly afterwards, the processor CP cooperates with the distributor SD to deactivate the ringing circuits AR and RC for both opening the paths from these circuits to the network TLN and for returning these circuits to their idle state. The processor then proceeds to establish a talking connection through the networks LLN and TLN, appearances A1 and A2, and the trunk circuit TC. The processor effects the establishment of the call connections by supplying command signals via bus BSC to the controllers of networks LLN and TLN and to the trunk circuit TC via the signal distributor SD. The signals applied to the trunk circuit TC provide for a loop around transmission path between the appearances A1 and A2. The call conversation may then be in progress between the calling and called parties. While the call is in progress, the trunk circuit TC is periodically scanned via the scanner S2 under the control of the processor to detect when the call is terminated.

After the caller or called party replaces the telephone handset in its cradle, a call disconnect signal may be sensed by the scanner S2 and it is subsequently readout by the processor CP during the scanning operation. The processor CP then initiates a timing interval as a safeguard against a false "on-hook" signal. When the timing has been completed and assuming that the calling line L1 receives an "on-hook" signal first, the call connections from the line L1 to the trunk circuit TC are released. Scanner S2 and processor CP then await an "on-hook" supervision signal from the called line and, upon its receipt, circuit TC is switched back to its idle state under control of the processor CP and the distributor SD.

DETAILED DESCRIPTION

Referring now to FIG. 2, a detailed description is presented of the structure and operations of the ringing control circuit RC embodying features of the present invention. This ringing circuit is a switching circuit which provides a communication path over the tip and ring leads TA and RA from the trunk link network TLN and another communication path over the leads RCL and G to a ringing current source RCS. These paths are selectively interconnected within the ringing circuit RC through the windings of transformer XT and relay RT, as well as through the protective varistor V1 under the control of the contacts of the magnetic latching relays A through D and the auxiliary relays RT1 and RT2.

The windings of transformer XT are serially connected between lead G and either lead TA or RA under control of relays B and C during the ringing interval for limiting the current flow through these leads which may be caused by lightning surges. These windings are connected to the T1 lead via contacts B–1 and RT2–1 when ringing the ring party on a two-party line. They are connected to lead R1 via contacts C–1 and RT2–1 when ringing the tip party on a two-party line.

Relay RT is a trip ringing relay. The winding of this relay is serially connected with a called customer line and it is operated by the D.C. current flow produced in the tip and ring path when the called telephone handset is removed from the switchhook. Relay RT is sensitive to D.C. and does not operate when ringing current is drawn through the tip and ring paths from the ringing current source RCS.

The relays RT1 and RT2 are auxiliary switching devices controlled by the contacts of relay RT and the magnetic latching relays A through D. Relay RT1 includes contact RT1–1 for locking itself operated during a power cross test as explained hereinafter and the contact RT1–2 for controlling the operation of relay RT2 after the power cross and leakage tests as described later. It also includes the contacts RT1–3 which connect the resistor R5 and capacitor C1 across the leads G and RCL to limit inductive surges which may be produced when ringing current flow is periodically interrupted in the transformer XT by the ringing current source RCS. Contact RT1–4 is used for inductive surge protection. It short circuits the windings of the transformer XT after the called party has answered but before the ringing current source RCS is disconnected from the called customer line under control of relay RT2. Contact RT1–5 is employed to disconnect the contact protection network comprising resistor R6 and capacitor C2 from across the winding of relay RT during the ringing of the called customer telephone and thereby to enable the impedance of the RT relay winding to provide more satisfactory protection of the ringing equipment against damage from lightning surges.

Contacts RT2–2 and RT2–3 used in cooperation with contacts of relay D for connecting a ferrod sensor FS2 through the protective resistors R7 and R8 to the leads T1 and R1 so that leakage resistance tests may be made of the tip and ring path through the trunk link and line link networks TLN and LLN toward the called customer station as hereinafter explained. The contacts RT2–1 and RT2–4 are utilized for cutting through the connections between the leads TA and G and the leads RA and RCL after the satisfactory completion of the power cross and leakage tests as explained later.

Ringing circuit RC employs four magnetically latching relays designated A, B, C and D. These relays are operated over the leads LA–LD under control of pulse signals supplied by the distributor SD and permit the ringing circuit to be switched into sixteen different switching states. All of the states are shown pictorially in FIG. 2A in accordance with principles set forth in the article entitled "The Map Method for Synthesis of Combinational Logic Circuits" by M. Karnaugh in the American Institute of Electrical Engineers Transactions, volume 72, pages 593–599 of November 1953.

As shown in FIG. 2A, each of the relays A, B, C and D is assigned a weighting number 1, 2, 4 and 10, respectively, and each of the sixteen switching states is represented by a numerical designation which is the sum of the relay weighting numbers. The relays A, B, C and D are initially released to place the ringing circuit RC in its IDLE state 0 while it is not engaged in serving a call.

During a call, the relays A–D are selectively operated on a one-at-a-time basis to switch the ringing circuit into the next state required for serving a call. The ordered sequence in which the relays are operated is controlled by the program intelligence and is slightly different for ringing on individual coin and noncoin lines, as well as two-party and PBX telephone lines.

Each of the operating circuits for relays A, B, C and D includes a make contact A–1, B–2, C–2 or D–1 and a resistor R1, R2, R3 or R4, which shunts the winding of the relay when it is operated. One of the relays A, B, C or D is operated, as set forth in Doblmaier et al., when the distributor SD applies a momentary pulse potential to the associated one of the leads LA–LD and thereby completes the path through the relay winding to ground. Upon operating, the relay magnetically latches, or locks, its contacts in the actuated position and establishes the aforementioned shunt path around its winding to increase the current flow over the associated one of the leads LA–LD. The distributor SD detects this current increase and is thereby notified that the proper relay has been operated. An operated relay A, B, C or D is released in response to a momentary pulse potential which is of the opposite polarity to that of the operating potential.

Various contacts of the relays A–D are used for selectively connecting the ferrod sensors FS0, FS1 and FS2 to the leads TA and RA via the resistors R7–R11 and scan leads SL1–SL6. The functions of these ferrods are described in detail hereinafter. Briefly, however, ferrod FS0 is used for the power cross, or foreign potential, testing of called customer lines. Ferrod FS1 is employed for sensing when ringing current is supplied to the called station. The ferrod FS2 is utilized for sensing excessive leakage on the called customer loop which leakage could cause the false tripping of ringing and erroneous charging information. Ferrod FS2 is also selectively used for sensing the tripping of ringing after the called party answers.

Each of the ferrods FS0, FS1 and FS2 is a sensing element which senses the presence or absence of current flow through the associated pair of the leads SL1–SL6. The presence of current in these leads represents an "off-hook" signal and the absence of current represents an "on-hook" signal. A ferrod may be described simply as a saturable transformer. It comprises a rod of ferrite material around which are wound a pair of control windings. Each pair of control windings of the ferrods FS0 and FS1 are serially connected. The ferrod FS1 has one winding terminal connected to a ground potential 1 and another winding terminal connectable to the leads TA and RA for the power cross testing. The FS1 ferrod windings are serially connected with the RA or TA and RCL leads for sensing the flow of ringing current. Each of the control windings of ferrod FS2 is connected to a potential source, such as the ground 2 or negative potential 3, and to a scan lead SL5 or SL6 for selectively sensing an excessive leakage resistance and the tripping of ringing current.

In addition, each of the ferrods FS0–FS2 comprises an interrogate winding I and a read-out winding RO each of which is threaded through each of a pair of holes in the approximate center of the ferrod rod. When current flows through the control windings of a ferrod, the ferrite rod is saturated and its incremental permeability approaches that of air. When no current flows through the control windings, the permeability of the rod is relatively high. This low-high permeability characteristic of the rod is utilized for enabling the device to sense "on-hook" and "off-hook" signals and for interrogating and reading out the sensed signals. During the scanning operation, the central processor CP causes a pulse to be selectively applied to the interrogate winding I of each of the ferrods FS0, FS1 and FS2. If no current is flowing through the control winding of that ferrod, a pulse is coupled by transformer action to the read-out winding RO of the same ferrod for indicating an "on-hook" signal. On the other hand, if current is flowing through the ferrod control windings, the ferrod is saturated and the interrogating pulse is essentially not coupled to the read-out winding RO for indicating an "off-hook" signal.

Figure 1:
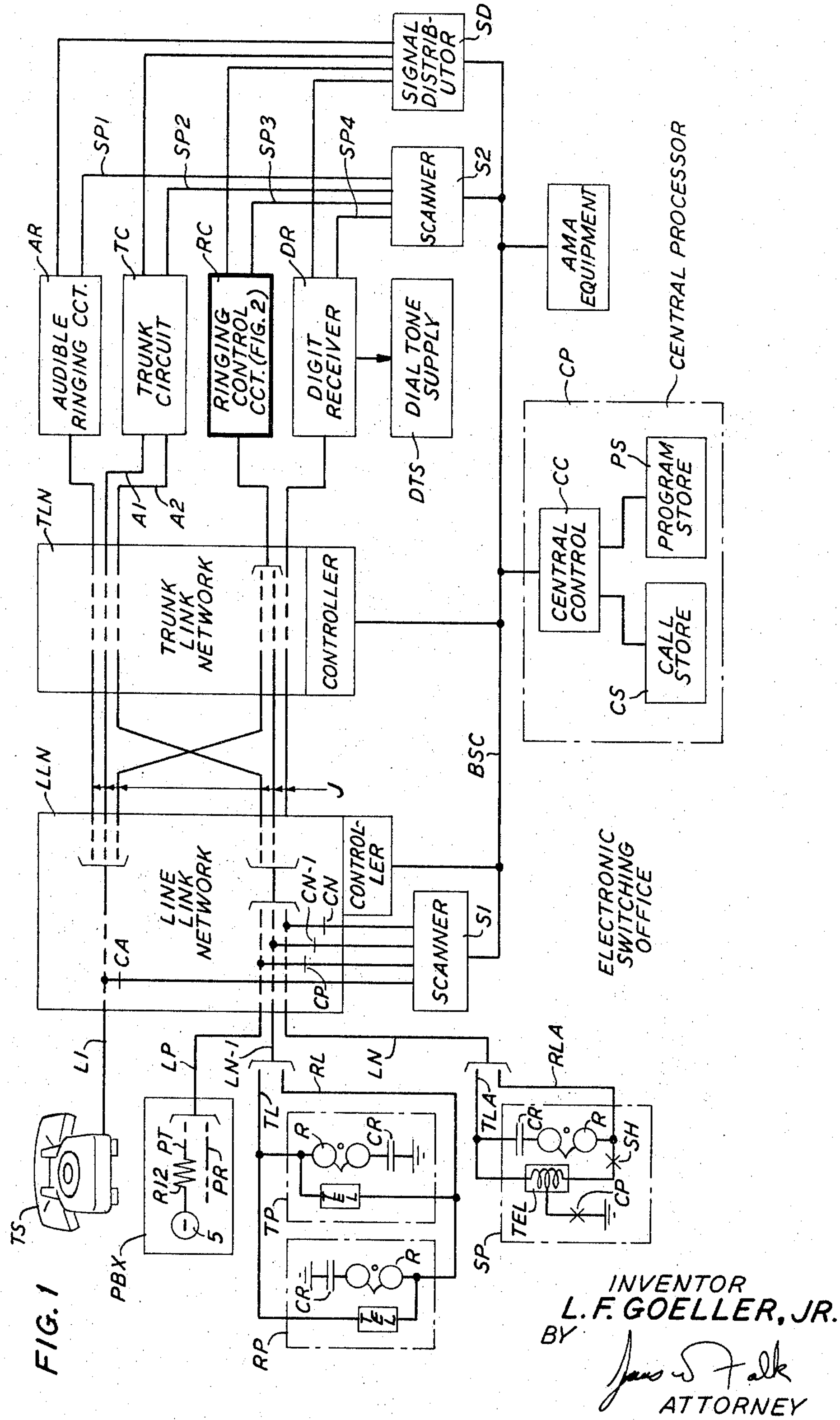
FIG. 1 is a block diagram of a program controlled telephone system employing ringing circuitry in accordance with my invention.

The detailed operations of the ringing circuit RC may be best understood by describing the ordered sequences of relay operations that occur therein for ringing the ringers R of the private and two-party customer telephones SP, TP and RP of FIG. 1, as well as those (not shown) of the PBX station telephones. For the purpose of understanding the different sequences, the ringing of a tip party telephone TP of FIG. 1 is classified as a RING TIP operation. Similarly, the ringing of a private or ring party telephone SP or RP is classified as a RING RING operation. The ringing of a PBX telephone is classified as a RING PBX operation. The following list indicates the typical sequence of states which the ringing circuit RC assumes for the aforementioned three types of ringing operations. It is noted, however, that these sequences assume no trouble conditions, customer abandonment of calls, called line busy conditions and the like:

| | |
|---|---|
| RING RING | 0–1–3–2–0 |
| RING TIP | 0–1–5–4–0 |
| RING PBX | 0–10–11–13–3–2–0 |

FOREIGN POTENTIAL TEST

The ringing circuit RC is in its IDLE state 0 when the four magnetically latching relays A–D and the relays RT, RT1 and RT2 are all in their released state. After a call has been initiated and has progressed through the electronic switching office of FIG. 1 to the point where the processor CP has ascertained that the services of a ringing circuit RC are required, an idle ringing circuit RC is located by consulting the busy-idle status thereof in the call store CS of FIG. 1. When such an idle circuit has been located, it is engaged on the call and its busy-idle status is updated in the store CS to reflect the engagement. Subsequently, the processor CP orders the line and trunk link networks LLN and TLN to interconnect the called customer line LN–1, LN or LP to the leads TA and RA of FIG. 2 in a manner as explained in Doblmaier et al.

Next, the processor CP and distributor SD activate the circuit RC so that a test for foreign potential is made on the called line. When this test is to be made on the line LN–1 or LN of FIG. 1, the processor CP and distributor SD activate the relay A for switching circuit RC from its IDLE state 0 to its POWER CROSS state 1. In operating, relay A completes paths whereby the leads TA and RA are connected to ferrod FS0. One of these paths is from ground via lead SL2 ferrod control windings, contact A–3, resistor R11, and contacts B–3 and C–3 to lead RA. The other path is from lead TA via contacts B–4 and C–4, resistors R9 and R10, contact A–4 and lead SL1 to ferrod FS0. Accordingly, if the called line connected through the networks LLN and TLN to leads TA and RA is crossed to another line having thereon an AC or DC voltage, such as a commercial power line voltage, a sufficiently high magnitude of current flows over the previously described path for saturating ferrod FS0. Thereafter, processor CP and scanner S2 periodically scan ferrod FS0 as previously described and detect this condition. Processor CP then recognizes that the circuit RC should not be further activated to apply ringing current to the called line since to do so might result in damage to the ringing circuit apparatus or that of the networks LLN and TLN or falsely operate relay RT to trip ringing. When such a power cross is detected, processor CP may effect the release of the call connections to the ringing circuits RC and AR and a proceed to route the calling line to an operator position for service.

The resistors R9 and R11 are serially connected with the FS0 ferrod control windings to limit the current, which might be drawn from a foreign voltage source crossed to the called line, to a value that does not cause damage to the ferrod FS0 or the ferrod switches (not shown) of the networks LLN or TLN. The varistor V2 is a voltage limiting device which offers a low resistance to a predetermined high voltage and a relatively high resistance to a prescribed low voltage. It is bridged across the FS0 ferrod control windings to protect the ferrod from excessively high current produced by either a foreign voltage on the called line or an inductive voltage surge generated when the current flow through the FS0 ferrod control windings is interrupted. Thus, varistor V2 protects the ferrod against foreign potentials and the system from ferrod coil produced noise.

Before proceeding further with the description of the ringing operations for a called line LN–1 or LN, it is advisable at this point to explain that the circuitry employed for power cross testing of a PBX line LP of FIG. 1 is essentially the same as previously explained for the line LN. For performing such a test on line LP, the processor CP and distributor SD first switch the circuit RC from its IDLE state 0 through its SET PBX state 10 into its PBX POWER CROSS state 11 by first operating relay D and then relay A as explained previously. In operating, relay D opens its contact D–2 to remove the low resistance shunt path around resistor R10 preparatory to the power cross test. When the relay A is operated, the FS0 ferrod control windings are connected to the TA and RA leads for testing the line LP. It is noted that the resistor R10 is inserted in the path beween the lead TA and ferrod FS0 in order to desensitize the power cross test on the tip lead PT of FIG. 1.

A potential 5 is normally connected to lead PT through a resistor R12 when a call is not in progress thereon. This resistance potential would cause a false power cross indication if the resistor R10 were not inserted in path between the TA lead and ferrod FS0. The inclusion of resistor R10 therein enables the ferrod FS0 to be insensitive to potential 5 on line LP and sensitive to undesirable power cross potentials.

LEAKAGE RESISTANCE TEST

If the called line LN–1, LN or LP associated with leads TA and RA is free from an undesired cross to a foreign potential, the processor CP and distributor SD proceed further to activate the ringing circuit RC so that it makes a leakage test of the tip and ring leads of the called line. The latter test is made to insure that the resistances between the tip and ring leads of the called line and between these leads and ground are not of such a magnitude as would cause the premature and undesired tripping of the ringing current, and thereby the false assessment of charges against the calling station. As is shown in the state diagram of FIG. 2A, the ringing circuit RC comprises three states TEST RING (3), TEST TIP (5) and TEST PBX (13) for the leakage tests. State 3 is used for performing the test of each of the pairs of tip and ring leads TL, RL and TLA, RLA of FIG. 1 on calls to the ring and single party telephones RP and SP, respectively. State 5 is used for the test of leads TL and RL on calls to the tip party telephone TP. State 13 is used for testing the leads TP and RP on calls to the PBX.

To make such a test on the line LN–1 or LN and specifically for a call to the telephone RP or SP, the processor CP and distributor SD switch the ringing circuit RC from its POWER CROSS state 1 to its TEST RING state 3 by activating relay B, as already explained, immediately after the power cross test has been satisfactorily completed. Upon operating, relay B latches operated. It also disconnects ferrod FS0 from the leads TA and RA at contacts B–3 and B–4. In addition, it connects the FS1 and FS2 ferrod control windings in series with the leads TA and RA so that the leakage conduction test is made between the tip and ring leads of either line LN–1 or line LN and between the ring lead of that line and ground. The connections are from lead RA via contacts C–3 and B–6, the leads SL3, SL4 and FS1 ferrod control windings in parallel with varistor V1, contacts RT2–2 and D–4, resistor R7, lead SL5 and the left control winding of ferrod FS2 to the negative potential 3; and from lead TA via contacts B–1, RT2–3 and D–3, resistor R8, lead SL6, and the right control winding of ferrod FS2 to ground 2.

When the leakage resistance is below a predetermined value between either the leads TL and RL or between lead RL and ground on calls to telephone RP, or between leads TLA and RLA or between lead RLA and ground on calls to telephone SP, a prescribed current is conducted via lead RA through the left control winding of ferrod FS2 to potential 3. This current saturates the ferrod FS2 so that the processor CP detects the undesired leakage condition during the scanning operation. After such a detection, the processor CP effects the release of the call connections to the ringing circuits RC and AR and the making of a record, such as a teletypewriter record, of the leakage condition and the involved called line. In addition, the processor CP causes the calling line to be connected to an operator position for obtaining information concerning the unavailability of the called line.

Before proceeding further to the description of the leakage test for a call to telephone TP, it is advisable to explain that either a noncoin or coin telephone may be operatively connected to the line LN of FIG. 1 for providing private line service to a customer. However, in order to illustrate an additional aspect of the leakage test apparatus, a so-called ground start coin telephone SP having a coin present contact CP and a switchhook contact SH is depicted in FIG. 1. A noncoin telephone is not equipped with the coin present contact and the phone is connected to line LN in essentially the same manner as phone SP. The coin phone SP is used in order to illustrate that the leakage test apparatus of this invention senses an excessive leakage resistance on line LN and thereby prevents a false charge against a calling customer which charge would be assessed if ringing current was applied to such a phone when its receiver was "off-hook" and no coin was present in the coin slot. Such a receiver "off-hook" condition with no coin in the slot closes the switchhook contact SH but it is not sensed by the scanner S1 of FIG. 1 as a call origination. The concurrence of a receiver "off-hook" and coin in the slot is required for providing the ground start to the line LN to initiate a call. However, when the receiver is "off-hook" without the coin present, a bridged resistance is connected across line LN and this resistance would cause a sufficient current to flow over the tip and ring lead path for operating the ringing trip relay RT of FIG. 2. In operating, relay RT would trip the ringing and would initiate circuit actions whereby a charge would be assessed to the calling party. Moreover, the ringer R of the phone SP would not be rung due to the bridging resistance. Such receiver "off-hook" without coin in slot conditions frequently arise inadvertently in telephone systems. In accordance with the present invention, the existence of such a condition on a coin telephone line causes a sufficient current to flow over the tip and ring paths including leads TA and RA and through the control windings of ferrod FS2 when the ringing circuit RC is in its TEST RING state 3. This current saturates that ferrod and enables the processor CP to detect the abnormal service condition. After the detection of such condition, the call connections to the circuits RC and AR are released and the calling line is connected to an operator position for service, as previously described.

Turning now to the leakage test on the line LN–1 for the tip party telephone TP, it is noted that the circuit actions are essentially the same as those described with respect to the test thereon for the ring party telephone RP. The major difference is that it is necessary to reverse the TA and RA lead connections to the FS2 ferrod control windings so that potential 3 is connected to lead TL instead of lead RL of FIG. 1 via lead TA and networks TLN and LLN. This reversal is effected by the processor CP and distributor SD operating relay C, as previously explained, instead of relay B and thereby switching the circuit RC from its POWER CROSS state 1 to its TEST TIP state 5 instead of state 3. The operation of relay C disconnects the ferrod FS0 from leads TA and RA at contacts C–3 and C–4. It also connects the FS1 and FS2 ferrod control windings in series with the leads TA and RA for making the leakage test between the tip and ring leads TL and RL of FIG. 1 and between lead TL and ground. The connections are from potential 3 through the left control winding of ferrod FS2, lead SL5, resistor R7, contacts D–4 and RT2–2, varistor V1, in parallel with leads SL3, SL4 and ferrod FS1 control windings, and contacts C–7 and B–4 to lead TA; and from lead RA through contacts C–1, RT2–3 and D–3, resistor R8, leads SL6 and the right control winding of ferrod FS2 to ground 2. If excessively low leakage resistance is present, a current flows through at least the left control winding of ferrod FS2 to saturate the ferrod and thereby enable the processor CP to detect the leakage condition, make a trouble record and connect the calling line to an operator position for service as described hereinbefore.

For the leakage test of a PBX line LP, the processor CP and distributor SD switch the ringing circuit RC from its PBX POWER CROSS state 11 to its TEST PBX state 13 by operating relay B. In the latter state, the relays A, B and D are operated and relay C is released. Thus, the state 13 is essentially the same as state 03 except that relay D is operated for reversing the connections between leads TA and RA and the FS2 control windings. When relay B operates, it disconnects ferrod FS0 from the leads TA and RA at contacts B–3 and B–4 and connects the ferrod FS2 via leads TA and RA to the line LP of FIG. 1. The complete path is from the ground 2 through the right control winding of ferrod FS2, lead SL6, resistor R8, contacts D–5 and RT2–2, varistor V1 in parallel with ferrod FS1 and leads SL3 and SL4, contacts B–6 and C–3, lead RA and networks TLN and LLN to lead PR; and from the negative potential 5 through resistor R12, lead PT, networks LLN and TLN, lead TA, contacts B–1, RT2–3 and D–6. resistor R7, lead SL5 and the left control winding of ferrod FS2 to potential 3. It is noted that the negative potentials 3 and 5 thus connected to lead PT tend to cancel each other and the only current which flows in the described circuit through the FS2 ferrod control windings is due to leakage resistance between the leads PT and PR and the minimal differences on the potentials 3 and 5. The latter leakage does not cause a call origination on the ground start line LP, but it is sufficient to effect the premature operation of the ringing trip relay RT of FIG. 2 and the AMA equipment of FIG. 1 for falsely charging the caller. Hence, before the ringing circuit RC is switched into its ringing state wherein relay RT is connected to leads TA and RA, it is switched into its TEST PBX state so that a leakage test is made and relay RT is not falsely operated under control of excessive leakage resistance on line LP. In the latter state 13, if excessively low leakage resistance is present between the leads PT and PR, a sufficient current flows through the control windings of ferrod FS2 over the previously traced path for saturating ferrod FS2 and enabling the processor CP to detect the leakage condition, make a trouble record and connect the calling line to an operator position for service as explained previously.

Whenever relay B or C operates following the operation of relay A and during a leakage test, the relay RT1 is operated over the path from the negative potential 4 through the RT1 relay winding, contacts C–5 and B–5 or C–6 and B–7, and contact A–5 to ground. In operating, relay RT1 locks via contacts RT1–1 and RT–1 to ground. The operation of relay RT1 opens the low resistance shunt path around XT transformer windings at contact RT1–4 in order to limit the lightning voltage surges on leads TA and RA during the subsequent ringing interval.

Operated relay RT1 also connects the resistor R5 and capacitor C1 across the G and RCL leads via contact RT1–3 for limiting voltage surges on these leads when the ringing current subsequently applied thereto is periodically interrupted by interrupter contacts IC–1 and IC–2 of ringing source RCS.

In addition, relay RT1 opens its contact RT1–5 to disconnect the bridging capacitor C2 and resistor R6 from across the RT relay winding so that the inductance of the latter winding provides desirable lightning voltage surge protection for the ringing circuit RC and the associated switching apparatus of the networks TLN and LLN during the actual ringing of the called telephone. It is important to note that the protection network comprising resistor R6 and capacitor C2 is incorporated into the RT relay to protect the contacts, such as RT2–4 and RT2–1, by limiting the voltage surges produced when the current through that relay winding is interrupted after the called party disconnects at the end of the call. However, if this network were to be bridged across the RT relay winding when a lightning surge voltage is induced on an associated called line, it would provide a lower impedance than the relay winding and consequently would produce a higher current over the tip or ring lead path through the networks LLN and TLN. Accordingly, the contact RT1–5 is used for disconnecting the protection network from across the RT relay winding while it is associated with a called line.

RINGING THE CALLED TELEPHONE

After the processor CP has ascertained that excessively low leakage resistance is not present on the called line, it activates the ringing circuit RC for applying ringing current to the called telephone. In the illustrative embodiment of my invention, the ringing source RCS comprises a battery B, a 20-cycle alternating current source ACS and the interrupter contacts IC–1 and IC–2. The battery B is connected to the lead RCL of circuit RCS either via contact IC–1 or in series with source ACS via contact IC–2, and its power is used for operating the ringing trip relay RT, as later explained, after the called party answers. The AC power is coupled to lead RCL for causing the activation of the ringer of the called telephone. The contacts IC–1 and IC–2 may form part of a power driven interrupter machine (not shown) which periodically opens and closes the contacts selectively to control the application of either the power of battery B only to the lead RCL or alternatively the B battery power superimposed with the 20-cycle AC of source ACS.

When a call is to be completed to the telephone RP or SP of FIG. 1, the processor CP and distributor SD switch the circuit RC from its TEST RING state 3 into its RING RING state 2 by releasing relay A. Similarly, when the call is to a telephone of the PBX of FIG. 1, the processor CP and distributor SD switch the circuit RC from its TEST PBX state 13 into its state 3 and then into its RING RING state 2 by successively releasing relays D and A. In state 2, relays A, C and D are released and relay B is operated.

Upon releasing, relay A causes the operation of relay RT2 over the path from potential 4 through the RT2 relay winding and contacts RT1–2 and A–6 to ground. The operation of relay RT2 opens the contacts RT2–3 and RT2–2 to disconnect the ferrods FS2 from leads TA and RA. It also closes the contacts RT2–1 and RT2–4 for completing the circuit through the ringer of the called telephone to the source RCS. This circuit is from source RCS over lead RCL, contact RT2–5, the RT relay winding, contact RT2–4, varistor V1 in parallel with leads SL3, SL4 and ferrod FS1, contacts B–6 and C–3, lead RA, networks TLN and LLN, the ring lead of the called line, and the ringer R and the associated capacitor CR of the called phone to ground. The circuit also includes the path from ground 6 through the transformer XT, contacts RT2–1 and B–1, lead TA, and networks TLN and LLN to the tip lead of the called line.

On a call to be completed to a tip party telephone TP of FIG. 1, the processor CP and distributor SD switch the circuit RC from its TEST TIP state 5 into its RING TIP state 4 by releasing relay A. In state 4, relay C is operated and relays A, B and D are released. State 4 differs from state 2 in that the connections between source RCS and the leads TA and RA are reversed to apply ringing power to the tip instead of the ring lead of the called line. When the A relay is released, it operates relay RT2 as already described. The operation of relay RT2 connects the source RCS over lead RCL through contact RT2–5, the RT relay winding, contact RT2–4, varistor V1 in parallel with leads SL3, SL4 and ferrod FS1, contacts C–7 and B–4, lead TA, networks TLN and LLN, the tip lead such as lead TL of the called line, and the ringer R and associated capacitor CR of the called phone to ground. At the same time, relay RT2 connects the ground 6 through transformer T, contacts RT2–1 and C–1, lead RA, and networks TLN and LLN to the ring lead of the called line.

After the source RCS has been connected to the called line, its contact IC–2 is closed for supplying ringing current from the source ACS over the already described path to actuate the ringer of the called telephone and thereby suply a ringing signal for alerting a person at the called station. The control windings of ferrod FS1 are included in the last-mentioned path for sensing the application of the ringing current to the called telephone. When such current flows, it saturates the ferrod FS1 and enables the processor CP to check that ringing is in progress.

The AC ringing current is interrupted at periodic intervals thereafter when contact IC–2 is opened. Upon the opening of this contact, an inductive voltage surge is present on lead RCL due to the interruption of the ringing current flow through the transformer XT. This surge voltage is limited by the capacitor C1 and resistor R5 to prevent damage to the interrupter contacts and to limit noise signal radiation to other circuits of the system.

When the call is answered, the switchhook of the called phone connects a resistance across the tip and ring leads of the called line to complete the previously traced path through the RT relay winding to the battery B and ground 6 for operating that relay. In operating, relay RT opens the locking path of relay RT1 at contact RT–1 for releasing that relay. The release of relay RT1 recloses contact RT1–5 to reconnect the network of capacitor C2 and resistor R6 across the RT relay winding. This network limits the inductive voltage surge produced by relay RT when it releases as explained later. Released relay RT1 also recloses the contact RT1–4 to short-circuit the XT transformer windings for limiting the inductive voltage surges produced by the transformer when relay RT2 is released as hereinafter described.

The release of relay RT1 also opens contact RT1–2 for releasing relay RT2. Upon releasing, relay RT2 releases relay RT and trips, or terminates, the ringing of the called phone by opening the connections between the source RCS and the called line at contacts RT2–1 and RT2–4. At the same time, relay RT2 recloses contacts RT2–2 and RT2–3 to reconnect the ferrod FS2 to leads TA and RA for sensing the tripped ringing. The sensing occurs as the result of current flow from the potential 3 and ground 2 through the FS2 ferrod control windings via the leads TA and RA, networks TLN and LLN, and the called line and telephone for saturating that ferrod. During the scanning of ferrod FS2, the processor CP detects the tripped ringing and orders the distributor SD to release the relay B or C and thereby restore the circuit RC to its IDLE state 0.

It is to be understood that the above-described arrangements are illustrative of the application of the principles of the present invention. Numerous other arrangements may be devised by those skilled in the art without departing from the spirit and scope of the invention.

What is claimed is:

1. In combination, a communication line, a communication station associated with said line, a signaling device at said station operable for supplying an alerting signal, a signaling control circuit, means for generating instruction signals, and means responsive to the receipt to said instruction signals for connecting said circuit to said line for controlling the operation of said device, said control circuit comprising means responsive to said instruction signals for switching said circuit into a plurality of distinct configurations to test the electrical leakage and foreign potential conditions of said line, a source of power for operating said device, and apparatus activated by said switching means for supplying said power to said line for operating said device.

2. In combination, a communication line, a communication station associated with said line, a signaling device at said station operable for supplying an alerting signal, a signaling control circuit, means for connecting said circuit to said line for controlling the operation of said device, and means for generating instruction signals, said control circuit comprising means responsive to said instruction signals for sensing a foreign potential on said line, means responsive to said instruction signals for sensing the resistance on said line, a source of power for operating said device, and apparatus activated by said instruction signals in the absence of a sensed foreign potential and a prescribed resistance on said line for supplying said power to said line for operating said device.

3. In combination, a communication line, means for generating instruction signals, and a sensing circuit comprising a source of potential and ground, a ferrod having a two-terminal control winding, one of said terminals being connected to said ground and the other of said terminals being connectable to said line for sensing a prescribed potential thereon, another ferrod having a two-terminal control winding, one of said terminals being connected to said potential source and the other of said terminals being connectable to said line for sensing the resistance of said line, and switching means responsive to the receipt of said instruction signals for successively connecting each of said ferrods individually to said line.

4. In combination, a two-conductor communication line; means for generating instruction signals; and a leakage resistance sensing circuit comprising a source of potential and ground, a ferrod sensor comprising a pair of two-terminal control windings, one of said terminals of one of said windings being connected to said potential source and the other of said terminals being selectively connectable to an individual one of said line conductors, one of said terminals of the other of said windings being connected to said ground and being selectively connectable to the other one of said line conductors for sensing the leakage resistance between each of said line conductors and between one of said conductors and ground, and switching means including an electromechanical device responsive to said instruction signals for selectively connecting each of said other terminals individually to one of said line conductors for enabling said ferrod to sense said leakage resistances, and another electromechanical device responsive to said instruction signals for selectively reversing the connections between each of said other terminals and each of said conductors for sensing the leakage current between the other one of said conductors and ground.

5. A ringing control circuit for a common control telephone system comprising a plurality of magnetically latching relays activated by electrical pulse signals received over control leads from common control equipment in the system, a communication path connectable over a communication line to a telephone of said system, a source for supplying power to activate the ringer device of said telephone, means responsive to the sequential operation of said relays for establishing a plurality of distinct leakage and foreign potential testing connections to said path and for establishing distinct signaling connections between said path and said source to activate said device, and means also responsive to said relay activations for establishing supervisory connections to said testing and signaling connections.

6. A ringing control circuit in accordance with claim 5 further comprising current sensitive devices associated with said supervisory connections for sensing a plurality of distinct electrical leakage and foreign potential conditions on said communication line.

7. A ringing control circuit in accordance with claim 6 wherein said current sensitive devices include a first ferrod for sensing a foreign potential on said line, a second ferrod for sensing the leakage resistance of said line, and a third ferrod for sensing the supply of ringing power to said line.

8. A ringing control circuit in accordance with claim 5 further comprising a current sensitive device for sensing the supply of said power to said signaling connections means included in said signaling connections and operable for detecting when said telephone has been answered, and auxiliary means included in said establishing means and responsive to the operation of said detecting means for interrupting said signaling connections.

9. A ringing control circuit in accordance with claim 8 wherein said current sensitive device comprises a ferrod connectable to said path via said establishing means and contacts of said relays.

10. A ringing circuit for a communication system comprising a ringing path connectable via a communication line to a telephone having a ringer, a source of ringing power for actuating said ringer, and a ferrod associated in a circuit with said path and source for sensing the supply of said ringing power to said path.

11. A ringing circuit in accordance with claim 10 wherein said path comprises at least one conductor and said ferrod comprises a control winding serially connected between said source and said one conductor and being responsive to the flow of ringing current between said source and conductor for saturating said ferrod, an interrogate winding, and a read-out winding; and further comprising means for applying interrogate signals to said interrogate winding and means responsive to the application of said signals to said interrogate winding for detecting the state of said ferrod.

12. A ringing circuit in accordance with claim 11 further comprising a voltage limiting device connected in parallel with said ferrod control winding between said source and said one conductor.

13. A ringing control circuit for a communication system comprising a pair of conductors connectable via a communication line to a telephone having a ringer; apparatus connectable to said conductors for sensing the electrical leakage and foreign potential conditions of said line; a source of ringing power for actuating said ringer; switching means responsive to the receipt of instruction signals for successively connecting said apparatus and said source individually to said conductors; said source comprising a direct current supply, an alternating current supply serially connected with said direct current supply, and an interrupter for cooperating with said switching means for periodically connecting said alternating current supply in series with said direct current supply and said conductors for actuating said ringer, and an electrical network selectively connected to said conductors by said switching means for limiting the surge voltages generated on said conductors upon the periodic disconnection of said series connection of said supplies and said conductors.

14. A ringing control circuit in accordance with claim 13 further comprising a ferrod having a control winding serially connected between one of said conductors and said source for sensing the flow of said direct and alternating currents over said conductors, and an electromechanical device serially connected between said ferrod winding and said source for detecting when the called telephone has been answered.

15. A ringing control circuit in accordance with claim 14 further comprising ferrod circuitry connectable to said conductors for sensing the interruption of ringing current, and wherein said switching means comprises an electromechanical switch controlled by said electromechanical device for disconnecting said source from said conductors and for connecting said ferrod circuitry to said conductors after said called telephone has been answered.

16. A signaling control circuit for a communication system comprising a pair of conductors connectable via a communication line to an electro-responsive device, apparatus connectable to said conductors for sensing the electrical leakage and foreign potential conditions of said line, a source of ringing power for actuating said device, and switching means responsive to the receipt of instruction signals for successively connecting said apparatus and said source individually to said conductors.

17. A signaling control circuit in accordance with claim 16 wherein said apparatus comprises circuitry for sensing the leakage resistance between each of the conductors of said line and ground including a resistor, a source of potential, and a ferrod having a two-terminal control winding at one of said terminals being connected to said source and the other terminal being connected to said resistor; and said switching means includes an electromechanical device responsive to the receipt of one of said instruction signals for selectively connecting said resistor individually to each of said conductors for enabling said ferrod to sense said leakage current.

18. A signaling control circuit in accordance with claim 16 wherein said apparatus comprises circuitry for sensing the leakage resistances between each of the conductors of said line and between each of the conductors of said line and ground including a pair of resistors, a source of potential and ground, a ferrod having a pair of two-terminal control windings, one terminal of one of said windings being connected to said ground, one terminal of the other of said windings being connected to said potential, each of the other terminals of said windings being individually connected to one of said resistors, and switching means including an electromechanical device responsive to the receipt of said instruction signals for selectively connecting each of said resistors individually to one of said conductors for enabling said ferrod to sense said leakage resistances.

19. A signaling control circuit in accordance with claim 16 wherein said apparatus comprises circuitry including a current sensitive device for sensing a foreign potential on said line and a pair of resistors, and said switching means comprises electromechanical elements responsive to the receipt of one of said instruction signals for selectively connecting each of said resistors to said device and individually to one of said conductors.

20. A signaling control circuit in accordance with claim 19 wherein said circuitry further comprises an additional resistor, and said switching means further comprises an additional electromechanical element responsive to the receipt of one of said instruction signals for selectively connecting said additional resistor in series with said device and one of said pair of resistors.

21. A signaling control circuit in accordance with claim 19 wherein said current sensitive device comprises a ferrod including a control winding having a pair of termini one being connected to a source of potential and the other being connectable to said resistors for sensing a foreign potential, and further comprising a voltage limiting device connected in parallel with said control winding.

22. A signaling control circuit in accordance with claim 21 wherein said voltage limiting device comprises a varistor.

23. In a telephone system, telephone lines, a digit receiver, a line connector and a trunk connector each being operable for establishing connections between any one of said lines and said receiver, means for monitoring for a calling service request signal from any of said lines, common control means responsive to the receipt of a service request by said monitoring means for operating said connectors to establish connections between the calling line and said receiver, means controlled by said control means for storing digits, means for transmitting digits received in said receiver to said storing means, a ringing control circuit having a pair of conductors terminated at said trunk connector, a ringing tone circuit having a termination in said trunk connector for supplying a tone signal to the calling line, means in said control means responsive to the storage of digits in said storing means for operating said line and trunk connectors to establish connections between said pair of conductors and the called one of said lines and between said termination and said calling line, a ringing current source, a sensing circuit having a ferrod for sensing foreign potentials on said called line, a ferrod for selectively sensing the leakage resistance and the tripping of ringing current on said called line and a ferrod for sensing the flow of ringing current to said called line, and switching means in said ringing control circuit activated by said control means for selectively establishing connections between said pair of conductors and each of said ferrods and between said pair of conductors and said source.

24. In a telephone system in accordance with claim 23, the combination wherein said ringing control circuit further comprises means for detecting when ringing under control of said source on any one of said telephone lines has been answered, and means activated by said switching means for selectively connecting said detecting means to said conductors.

25. In a telephone system in accordance with claim 24, the combination wherein said detecting means includes apparatus activated after ringing on any one of said lines has been answered for controlling said switching means to interrupt the connections between said conductors and said source, and apparatus for reconnecting one of said ferrods to said conductors for sensing said interruption of connections between said conductors and said source.

26. In a telephone system, telephone lines, a ringing and testing control circuit connectable to any of said lines, and means responsive to the receipt of a call for connecting said control circuit to a called one of said lines, said control circuit having means connectable to said called line for monitoring a prescribed potential thereon, means connectable to said called line for sensing the resistance of said called line, means connectable to said called line for applying ringing signals to said called line, and means for sequentially connecting said monitoring means, sensing means and applying means to said called line.

References Cited

UNITED STATES PATENTS

| | | | |
|---|---|---|---|
| 2,585,904 | 2/1952 | Busch. | |
| 3,300,589 | 1/1967 | Carter | 179—84 |

KATHLEEN H. CLAFFY, *Primary Examiner.*

A. A. McGILL, *Assistant Examiner.*